Dec. 16, 1924.  
R. L. BUNTING  
COMBINATION FENDER BRACE AND BUMPER  
Filed May 4, 1923
1,519,356
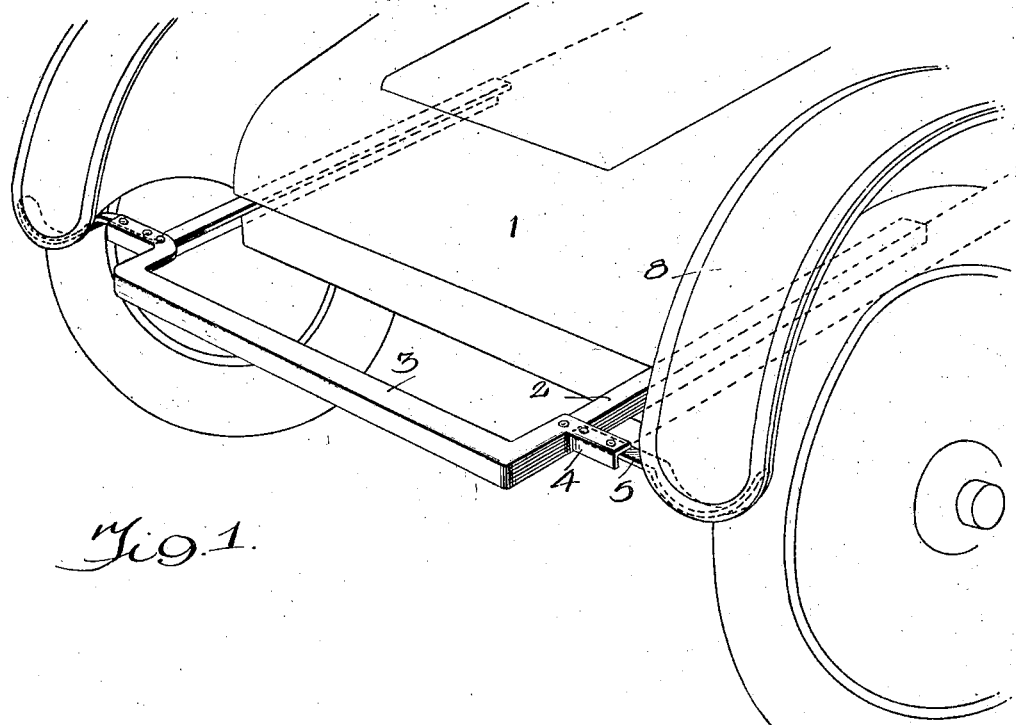
Fig. 1.
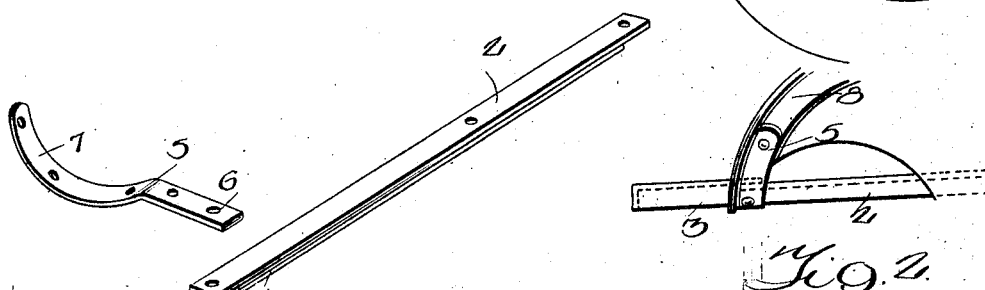
Fig. 3.   Fig. 2.
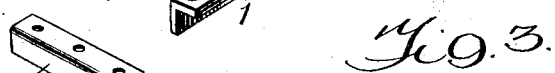
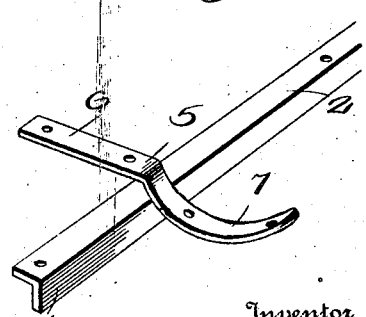
Inventor
R. L. BUNTING
By Richard B. Owens
Attorney Patented Dec. 16, 1924.

1,519,356

UNITED STATES PATENT OFFICE.

REINER L. BUNTING, OF COLUMBUS, NEBRASKA, ASSIGNOR TO FRED S. DAVIS, WILLIAM D. EGGERT, CARROLL E. DEVLIN, AND FRANK A. OLCOTT.

COMBINATION FENDER BRACE AND BUMPER.

Application filed May 4, 1923. Serial No. 636,633.

*To all whom it may concern:*

Be it known that I, REINER L. BUNTING, a citizen of the United States, residing at Columbus, in the county of Platte and State of Nebraska, have invented certain new and useful Improvements in a Combination Fender Brace and Bumper, of which the following is a specification.

The present invention relates to a combination fender brace and bumper having for its principal object to provide a device of this nature which is of simple, durable, attractive, efficient, and inexpensive construction, that can be readily and easily installed upon an automobile.

An important object of the invention is to provide a device of this nature which when installed upon the automobile will materially hold the fenders against undesirable movement relative to the automobile chassis.

Another important object of the invention is to provide means for bracing the automobile fenders so as to prevent them from becoming easily bent and at the same time provide a device which will protect the rear portions of the automobile from collisions.

With the above and numerous other objects in view as will appear as the description progresses, the invention consists in the combination and arrangement of details and in the improved structure of parts as will be hereinafter more fully described and claimed.

In the drawing—

Figure 1 is a perspective view of the rear portion of an automobile showing my combination fender brace and bumper attached thereto, Figure 2 is an end elevation of the device showing the same in its relative position with parts of an automobile, and Figure 3 is a perspective view of the combination fender brace and bumper with the elements thereof disassembled.

Referring to the drawing in detail it will be seen that the automobile body 1 which has been disclosed is of conventional construction and may be of any preferred type. My invention, however, is shown in conjunction with the Ford automobile type by way of example. The combination fender brace and bumper includes a pair of angle bars 2 which are substantially L-shaped in cross section and are secured to the chassis of the body 1 by means of screws or other suitable elements. A cross bar 3 is also L-shaped in cross section and is provided with offset extensions 4 disposed substantially parallel with the main portion thereof. A pair of fender engaging brackets 5 include a straight shank 6 which is adapted to be attached to the offset extension 4 and a curved portion 7 adapted to be connected with the flanges of the fenders 8. The bar 3 that is the intermediate portion thereof protects the body from collisions and also braces the fenders 8 in respect to each other. This bar 3 is disposed below the body 1 so as to allow the tire rack which is usually hung from the rear thereof to be easily placed in position so that it will be accessible.

Having thus described my invention what I claim as new is:—

1. In combination, a vehicle body including a pair of fenders and a chassis, and a combination fender brace and bumper including a pair of rods secured to the chassis, a cross bar secured to the ends of the first mentioned bars, and brackets secured to the ends of the cross bar and also secured to the ends of the fenders all in the manner and for the purpose specified.

2. In combination, a vehicle including a body, a chassis, and a pair of fenders, and a combination fender brace and bumper including a bar having offset extensions, means for supporting the bar on the chassis, brackets including shanks attached to the offset extensions and curved portions secured to the flanges of the fenders at their ends.

3. In combination, a vehicle including a body, a chassis, and a pair of fenders, and a combination fender brace and bumper including a pair of bars substantially L-shaped in cross section fixed to the chassis and extending a distance therefrom, a cross bar of L-shaped structure in cross section secured to the ends of the first mentioned bars and constructed with an intermediate body portion and end offset extensions, and a pair of brackets formed with straight shanks and curved portions, the straight shanks of the brackets being secured to the offset extensions and the curved portions being secured to the ends of the fenders.

In testimony whereof I affix my signature in presence of two witnesses.

REINER L. BUNTING.

Witnesses:
 GROVER LONG,
 ROSE NOVICKE.